United States Patent
Fernandes et al.

(10) Patent No.: US 7,499,931 B2
(45) Date of Patent: Mar. 3, 2009

(54) METHOD AND APPARATUS FOR APPROXIMATE PROJECTION OF XML DOCUMENTS

(75) Inventors: Rohit C. Fernandes, Ithaca, NY (US); Mukund Raghavachari, Baldwin Place, NY (US)

(73) Assignee: International Business Machines Corporation, Armonk, NY (US)

( * ) Notice: Subject to any disclaimer, the term of this patent is extended or adjusted under 35 U.S.C. 154(b) by 227 days.

(21) Appl. No.: 11/124,749

(22) Filed: May 9, 2005

(65) Prior Publication Data

US 2006/0253430 A1 Nov. 9, 2006

(51) Int. Cl.
G06F 7/00 (2006.01)
G06F 17/30 (2006.01)
(52) U.S. Cl. ............... 707/101; 707/104.1; 715/200
(58) Field of Classification Search ............ 707/3, 707/4, 5, 6, 2
See application file for complete search history.

(56) References Cited

U.S. PATENT DOCUMENTS

| | | | |
|---|---|---|---|
| 6,917,935 B2 * | 7/2005 | Zwiegincew et al. ............ 707/4 |
| 6,996,768 B1 * | 2/2006 | Elo et al. .................... 715/500 |
| 7,017,282 B2 * | 3/2006 | Pyo et al. ..................... 34/596 |
| 7,065,561 B2 * | 6/2006 | Fry et al. ..................... 709/219 |
| 7,120,645 B2 * | 10/2006 | Manikutty et al. .......... 707/102 |
| 7,134,075 B2 * | 11/2006 | Hind et al. .................. 715/513 |
| 7,165,239 B2 * | 1/2007 | Hejlsberg et al. ........... 717/114 |
| 7,171,407 B2 * | 1/2007 | Barton et al. .................. 707/4 |
| 2003/0101194 A1 * | 5/2003 | Rys et al. .................... 707/101 |
| 2003/0163285 A1 * | 8/2003 | Nakamura et al. .......... 702/179 |
| 2003/0172196 A1 * | 9/2003 | Hejlsberg et al. ........... 709/328 |
| 2003/0172348 A1 * | 9/2003 | Fry et al. .................... 715/513 |
| 2003/0221169 A1 * | 11/2003 | Swett .......................... 715/514 |
| 2004/0060007 A1 * | 3/2004 | Gottlob et al. .............. 715/513 |
| 2004/0064466 A1 * | 4/2004 | Manikutty et al. .......... 707/100 |
| 2004/0221229 A1 * | 11/2004 | Perry .......................... 715/514 |
| 2005/0022115 A1 * | 1/2005 | Baumgartner et al. ....... 715/513 |
| 2005/0055336 A1 * | 3/2005 | Hui et al. ...................... 707/3 |
| 2005/0086584 A1 * | 4/2005 | Sampathkumar et al. .. 715/501.1 |
| 2006/0020951 A1 * | 1/2006 | Fry et al. .................... 719/328 |
| 2006/0064424 A1 * | 3/2006 | Heuer et al. ................ 707/100 |
| 2006/0106758 A1 * | 5/2006 | Chen et al. .................... 707/2 |
| 2006/0106945 A1 * | 5/2006 | Westervelt et al. .......... 709/246 |
| 2006/0143557 A1 * | 6/2006 | Chan et al. .................. 715/500 |
| 2006/0150085 A1 * | 7/2006 | Davis et al. ................. 715/513 |
| 2006/0184510 A1 * | 8/2006 | Nishio .......................... 707/3 |
| 2006/0195454 A1 * | 8/2006 | Davis et al. ................. 707/100 |
| 2006/0195783 A1 * | 8/2006 | Davis et al. ................. 715/513 |

OTHER PUBLICATIONS

Amelie Marian, Jerome Simeon, "Projecting XML Documents," Berlin, Germany 2003, Proceedings of the 29th VLDB Conference.

* cited by examiner

*Primary Examiner*—Jean M Corrielus
*Assistant Examiner*—Mohammed R Uddin
(74) *Attorney, Agent, or Firm*—Michael J. Buchenhorner; Vazken Alexanian

(57) ABSTRACT

A method, computer readable medium and information processing system for projecting a representation of a document in the Extensible Markup Language (XML) format. The method dynamically creates a tree representation of an XML document based on a provided set of XPath expressions through approximate matching techniques. The projection created by the method supports all XPath axes including backward axes such as parent and ancestor. The execution of the set of XPath queries on the projected document is guaranteed to be the same as that of executing the XPath queries on the original document. The projected document typically occupies much less space than the original document.

12 Claims, 9 Drawing Sheets

METHOD AND APPARATUS FOR APPROXIMATE PROJECTION OF XML DOCUMENTS

FIELD OF THE INVENTION

The invention disclosed broadly relates to the field of information handling systems and more particularly relates to the field of querying data documents such as Extensible Markup Language (XML) documents.

BACKGROUND OF THE INVENTION

"Extensible Markup Language" (XML) is a textual notation for a class of data objects called "XML Documents" and partially describes a class of computer programs processing them. A characteristic of XML documents is that they use a hierarchical structure to organize information within the documents. This hierarchical structure may be represented using a rooted-tree data structure with node representing the "elements" of the XML document. Element nodes have a tag name, may be associated with named attributes, and may have relationships to other nodes in the tree, where such relationships may refer to "parent" and "child" nodes. In addition, element nodes may contain data in various forms (specifically text, comments, and special "processing instructions").

XML Document Trees.

An XML document can be represented as a labeled tree whose nodes represent the structural components of the document—elements, text, attributes, comments, and processing instructions. Element and attribute nodes have labels derived from the corresponding tags in the document and there may be more than one node in the document with the same label. Parent-child edges in the tree represent the inclusion of the child component in its parent element, where the scope of an element is bounded by its start and end tags. The tree corresponding to an XML document is rooted at a virtual element, called the root, which represents the document itself. Hereinafter, XML documents will be discussed in terms of their tree representations. One can define an arbitrary order on the nodes of a tree. One such order might be based on a left-to-right depth-first traversal of the tree, which, for a tree representation of an XML document, corresponds to the document order. The memory footprint of an XML document can be large. XML processors may not be able to handle large documents due to the memory requirement of storing the entire document. As a result, in processing XML, reducing the memory overhead of an XML document is of great importance.

XPath.

"XML Path Language" (XPath) is a query language for creating an expression that selects nodes of data from an XML document. XPath is used to address XML data using path notation to navigate through the hierarchical structure of an XML document. XPath queries allow applications to determine if a given node matches a pattern, including patterns involving its location in the XML document hierarchy.

XPath has been widely accepted in many environments, especially in database environments. Given the importance of XPath as a mechanism for querying and navigating data, it is important that the evaluation of XPath expressions on XML documents be as efficient as possible.

XPath Axes.

Given an order on a tree, we can define a notion of a forward and backward relation on a tree. A relation R is a forward relation if whenever two nodes x and y are related by R, x precedes y in the order on the tree. Similarly, a relation is a backward relation whenever x is related to y, x follows y in the order on the tree. For example, assuming the document order for a tree representation of an XML document, the child and descendant relations are both forward relations, whereas the parent and ancestor relations are both backward relations.

An XPath expression over the tree representation of an XML document is evaluated in terms of a context node. The context node is a node in the tree representation of the document, and is well known to those of skill in the art of XML. If the context node is the root node of the document, the XPath expression is said to be an absolute XPath expression, otherwise, it is known as a relative XPath expression. Starting at a context node, an XPath expression specifies the axis to search and conditions that the results should satisfy. For example, assume that the context node is an element node c in the tree representation of an XML document. The XPath expression "descendant::x" specifies a descendant axis, where searching begins at the context node, and produces a sequence of all element nodes that are descendants of the node c and are labeled "x". One can combine XPath expressions to form larger XPath expressions. For example, the XPath expression "descendant::x/ancestor::y" specifies that starting from the context node c, find all element nodes that are descendants of c with label x, and for each such node, find all ancestor nodes with label y.

XML Processing.

In traditional XML processing, a tree representation of an XML document that is to be processed is built in memory. When the document is large, this construction of the tree representation, for example, as an instance of the familiar Document Object Model (DOM), may be prohibitively expensive in both time and memory. For large documents, XML processing may fail due to the large memory requirements of the document. In main-memory XML processors, one of the primary sources of overhead is the cost of constructing and manipulating main-memory representations of XML documents.

The cost of construction of an in-memory data model instance of an XML document can be reduced significantly if only those portions that are relevant to the processing are instantiated. This insight is the basis for projection, an optimization introduced by Marian and Simeon. See Marian and Simeon, Projecting XML Documents, Proceedings of the 29th VLDB Conference, Berlin, Germany (2003). Given a set of XPath expressions and an XML document, a projected document is constructed such that the result of the execution of the set of XPath expressions on the projected document is the same as that of the execution of the set on the original document. For example, FIG. 1 depicts the tree representation of an XML document; the boxes in the figure with thick borders denote its projection with respect to the XPath expression "//Title", which selects for the projection all elements with the tag "title" in the document, in this case, elements 140 and 180. The projected document is usually substantially smaller than the original document. As a result, the in-memory construction time is lower than it might be otherwise. Moreover, as a side-effect, the smaller size of the projected document results in lower query evaluation times on the projected document than a similar evaluation on the original document. The root node of the tree is root 100. A "catalog" 110 is the next node. One branch begins at node 120 and another at node 160. The "book" nodes 130 and 170 begin another pair of sub-branches: a branch under "book" 130 includes "title" 140 and "compilers" 150 and the branch under "title" 180 includes the "algorithms" node 190.

The drawback to current techniques of projection is that they cannot handle complex XPath expressions. Current techniques are only defined for queries using child and descendant axes—other XPath axes such as parent and ancestor are not supported by the current schemes. Therefore, a need exists to overcome the problems with the prior art as discussed above, and particularly, for a way to project XML documents efficiently when XPath expressions contain axes other than child and descendant.

SUMMARY OF THE INVENTION

Briefly, according to embodiments of the invention, a method, computer readable medium, and apparatus (system) for constructing a projected representation of a document in the Extensible Markup Language (XML) format with respect to a set of expressions in XPath or other query language through approximate matching. The method of the present system supports all XPath axes, including backward axes and predicates.

The subject matter, which is regarded as the invention, is particularly pointed out and distinctly claimed in the claims at the conclusion of the specification. The foregoing and other features, and also the advantages of the invention, will be apparent from the following detailed description taken in conjunction with the accompanying drawings. Additionally, the left-most digit of a reference number identifies the drawing in which the reference number first appears.

DETAILED DESCRIPTION

We describe a method, computer readable medium, and information processing system for projecting a representation of a document in the XML format based on a set of XPath expressions, where the XPath expressions may involve use of both forward and backward axes.

Tree Model of XML Documents.

An XML document may be represented as a tree whose nodes represent the structural components of the document—elements, text, attributes, and the like. Parent-child edges in the tree represent the inclusion of the child component in its parent element, where the scope of an element is bounded by its start and end tags. The tree corresponding to an XML document is rooted at a virtual element, root, which contains the document element. A system according to an embodiment uses XML documents in terms of their tree representation; we will use "D" to denote an XML document, and $N_D$ and $E_D$ denote its nodes and edges respectively. For simplicity, the description focuses on XML elements, though one of ordinary skill in the art will be aware that the implementation can also handle the other XML nodes, such as attribute nodes. We assume that the following functions are available for the elements in an XML document:

$id_D$: $N_D \rightarrow$ Integer: Returns a unique identifier for each element in a document We assume that $id_D$ is a total order on the elements in D, such that the assignment of identifiers to elements corresponds to a depth-first preorder traversal of the tree (corresponds to document order in XML).

$tag_D$: $N_D \rightarrow$ String: Returns the tag name of the element.

$level_D$: $N_D \rightarrow$ Integer: Returns the distance of the element from the root, where $level_D$ (root)=0.

We also define functions, $child_D$, $desc_D$, $self_D$, $fs_D$, and $following_D$, each with the signature $N_D \times N_D \rightarrow \{true, false\}$. The semantics of these functions is straightforward, $child_D$ (v1, v2) returns true if v2 is a child of v1 in D, and $fs_D$ (v1, v2) returns true if v1 and v2 share a common parent, and moreover, $id_D(v1) < id_D(v2)$. $Following_D$ (v1, v2) returns true if $id_D(v2) > id_D(v1)$ and v2 is not an ancestor of v1. Finally, $self_D(v1, v2)$ returns true if v1=v2.

System Architecture

Figure 2:
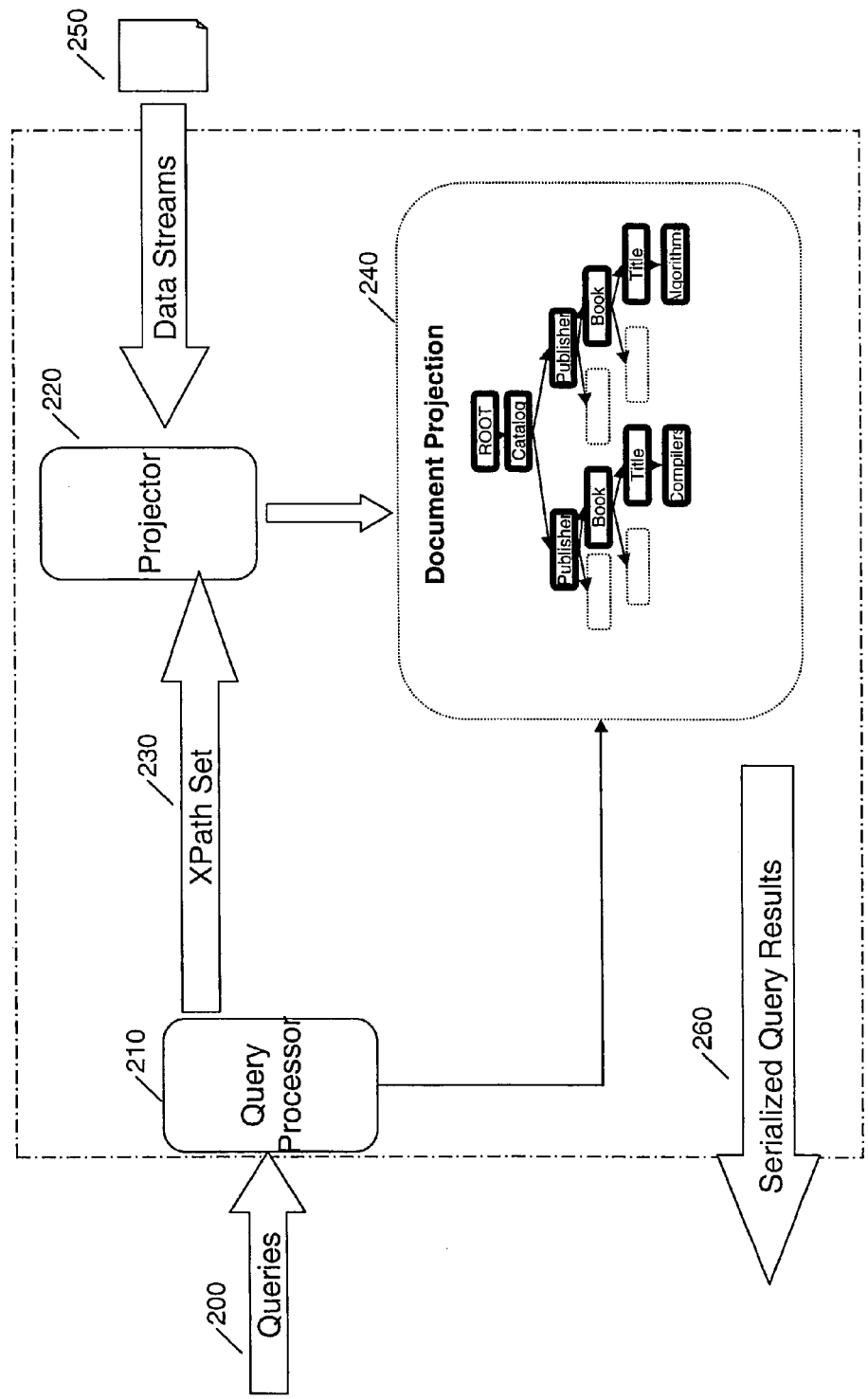
FIG. 2 illustrates one possible system architecture for a system according to an embodiment of the invention.

The architecture of our system is depicted in FIG. 2. A client provides a query (or set of queries) 200 that must be evaluated against document 250 (or set of documents) to Query Processor 210. The query processor derives a set of XPath expressions 230 from this set and passes it to the Projector 220. The Projector 220 constructs a representation of the input document based on the set of XPath expressions 230. A reference to the root of document 240 is returned to the query processor. The query processor then evaluates the query over projected document 240 and serializes results 260 back to the client. The result 260 of the execution of the query set 200 on the projected document 240 is guaranteed to be the same as if the query set 200 were executed on the original document 250.

In query evaluation, our system constructs a representation of the input document based on the XPath set 230 which is derived from the query set 200. In the current embodiment, this set is derived by hand from the query set 200, but other techniques such as static analysis and profiling may be used as well. The set of XPath expressions 230 passed to projector 220 is an approximation of the XPath expressions that may be executed during query evaluation of the query set 200—projector 220 must construct document projection 240 of the input document 250 based on this set efficiently. A novel feature of the projection algorithm discussed herein is the ability to handle complex XPath axes, as well as, predicates in an efficient manner.

Projection XPath Subset

The grammar of the set of XPath expressions 230 accepted by this projection algorithm is provided below. In the grammar, the non-terminal axis includes all axes defined in the XPath specification. Note that current art of projection algorithms cannot handle all XPath expressions as defined in the grammar; this grammar is used herein to explain at least one embodiment of the invention.

AbsLocPath :='/' RelLocPath

RelLocPath :=Step'/' RelLocPath|Step :=Axis:: NodeTest|

Step'['PredExpr']' PredExpr :=RelLocPath and PredExpr|

AbsLocPath and PredExpr|

RelLocPath|AbsLocPath

NodeTest :=String|*

An absolute path expression corresponds to one that satisfies AbsLocPath and is evaluated with respect to the root node of the tree. A relative XPath expression corresponds to RelLocPath, and is evaluated with respect to a provided set of elements in the tree.

XPath Expression Trees

Figure 3:
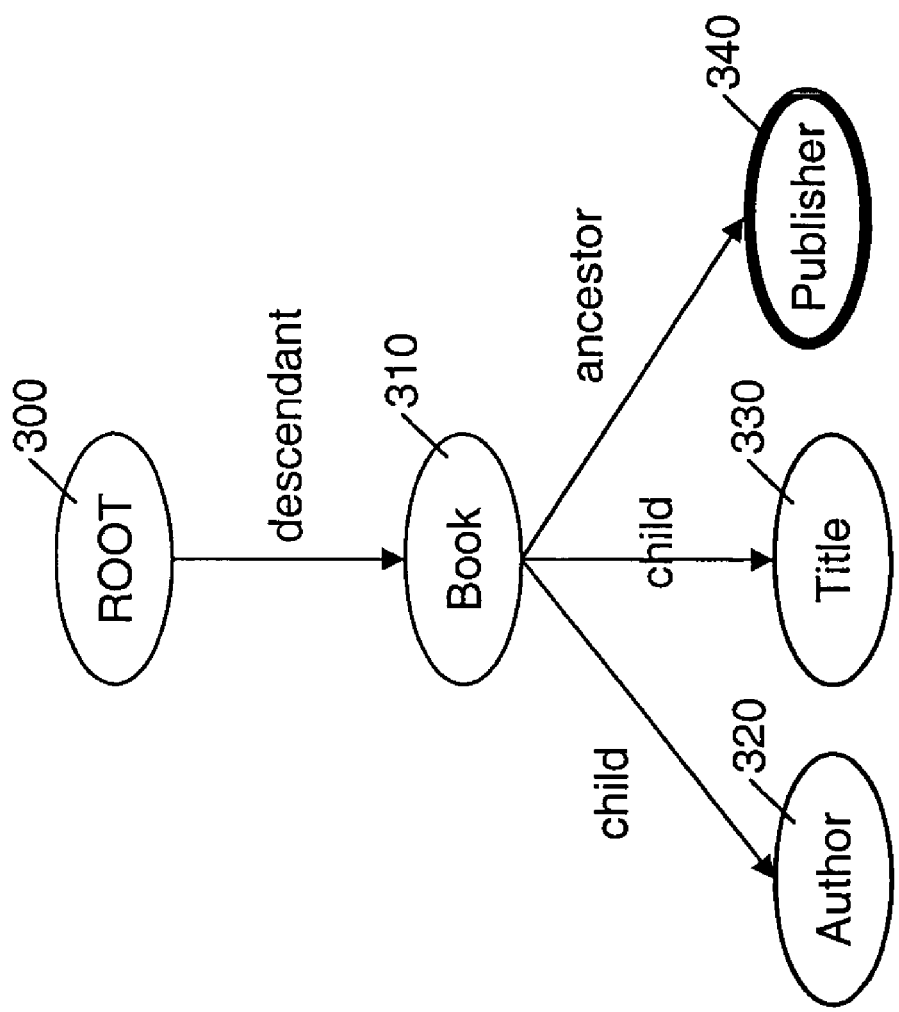
FIG. 3 illustrates a tree representation of an XPath expression in an embodiment of the present invention.

An XPath expression can be represented as a rooted tree $T=(V_T, E_T)$, with labeled vertices and edges. The root of the tree is labeled root. For every NodeTest in the expression, there is a vertex labeled with the NodeTest. Each vertex other than root has a unique incoming edge labeled with the Axis specified before the NodeTest. The vertex corresponding to the rightmost NodeTest which is not contained in a PredExpr is designated to be the output vertex. There are functions, $label_T: V_T \rightarrow String$, and $axis_T: E_T \rightarrow Axis$ that return the labels associated with the vertices and edges respectively. FIG. 3 provides an example of the tree representation of the XPath expression "//Book[Title and Author]/ancestor::Publisher". In XPath, "//," called the descendant operator, selects any Book element in the document. In FIG. 3, element Book 310 corresponds to this part of the expression. "[Title and Author]" requires element Book 310 to also have particular children, here Title 330 and Author 320 correspond to these requirements. The next part of the expression, "/ancestor::Publisher" is met by element Publisher 340, whose ancestor is element Book 310.

The semantics of an XPath expression is defined in terms of embeddings. The following definitions should be helpful in understanding embeddings.

Definition 1: A pair of elements (n1, n2) in a document, D, where n1, n2 are elements of $N_D$ satisfies an edge constraint (v1, v2) in the tree representation T of an XPath expression if the relation between n1 and n2 in the document matches $axis_T$ (v1, v2). For example, if $axis_T$(v1, v2)=child, $child_d$ (n1, n2)=true, and if $axis_T$(v1, v2)=ancestor, $desc_D$ (n2, n1)=true.

Definition 2: An embedding of an XPath expression T into a document D is a function $E: V_T \rightarrow N_D$ such that:
  Labels are matched, that is, for each v in $V_T$, $label_T(v)$=* or $label_T(v) = tag_D(E(v))$.
  Edges are satisfied, that is, if (v1, v2) in $E_T$, then (E(v1), E(v2)) satisfies (v1, v2).

Let O be the output vertex of the tree representation of an XPath expression. The output of an XPath expression is defined as all n in $N_D$ such that there exists an embedding E such that E(O)=n.

Redefining Projection.

A projected document is defined in the prior art by Marian and Simeon in terms of an input document D and a set of XPath expressions P, where some of the expressions may be marked with the special output flag #. In that system, each XPath expression in P is an absolute XPath expression (that is, it is evaluated with respect to the root of the document). Marian and Simeon only allow the use of the child and descendant axes, predicates and backward axes are not supported. Given P and D, the projected document D is defined in the prior art by Marian and Simeon as follows:

Definition 3: Given a document D and a set of projection paths P. D' is the projected document of D for the paths P if and only if D' is composed of the subset of the nodes n in D such that either: (i) the node n is in the result of the evaluation of a path p in P over D,(ii) the node n is an ancestor of a node n, where n is in the result of the evaluation of a path p in P over D, or (iii) the node n is a descendant of a node n', where n is in the result of the evaluation of a path p in P over D and p has the flag #.

The projected document contains all elements that are in the result set of an XPath expression in P, as well as, their ancestors. All subtrees rooted at some result of an XPath expression marked # are materialized as well. The definition guarantees that the projected document D' satisfies the key property that the evaluation of any XPath expression in P on D' returns the same result as the evaluation of that XPath expression on D. As a result, one can substitute D' for D without changing the behavior of query evaluation with respect to P.

Figure 1:
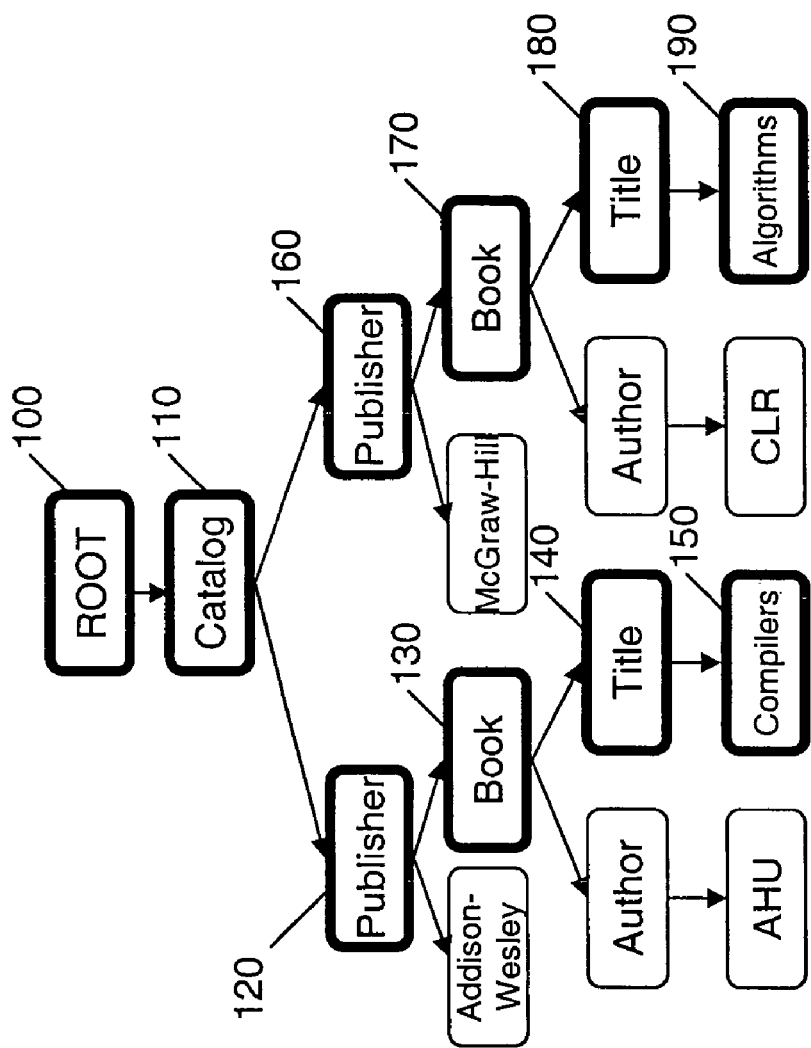
FIG. 1 illustrates a tree representation of an XML document.

When XPath expressions with axes other than child and descendant are allowed in P, Definition 3 can no longer be applied; the evaluation of an XPath expression on the projected document D' may differ from that on D. Consider the XPath expression, "//Author/ancestor::Publisher//Title" executed on the document in FIG. 1. By Definition 3, only the elements outlined in bold in the FIG. 1 belong to the projected document D'. The result of this XPath expression on D' will be the empty set since D' does not contain any "Author" elements.

The embeddings of XPath expressions into a document D can be used as the basis for a general definition of projection when complex axes such as ancestor are allowed. We provide a definition that subsumes Definition 3 and serves as the basis for the algorithm presented below.

Definition 4: Let D be a document and P be a set of absolute XPath expressions, where some XPath expressions in P are marked with a special flag #. The projected document D' is composed of the set of all elements n in D if:
  (1) For some XPath expression p in P, there is an embedding E of p into D such that E(v)=n, where v is some vertex in p; or
  (2) For some XPath expression p in P, there is an embedding E of p into D such that E(v)=n, where v is some vertex in p, and n is a descendant of n in D; or
  (3) For some XPath expression p in P marked with the symbol #, n is the descendant of an element in the results of the evaluation of p on D.

In other words, the projected document consists of all elements that participate in an embedding and their ancestors. Moreover, for each element in the result set of the evaluation of a specially marked XPath expression, that element and all its descendants belong to the projected document.

Projection Construction

The system encompasses an algorithm for constructing projections from a given set of XPath expressions. The challenge is in being able to handle complex XPath axes such as ancestor efficiently in a single pass over the input document. This embodiment takes advantage of a key property of projection; since the query processor eventually evaluates the input query over the projected tree to determine the exact solution to the query, the projection construction algorithm can be approximate. This embodiment creates nodes in the tree for some elements that do not satisfy any of the conditions of Definition 4. The algorithm is, however, careful in limiting the construction of these inessential nodes. This embodiment ensures that the result of executing the input query on the projected document is the same as that of executing on the original document.

The embodiment works in two stages. First, the set of input XPath expressions P is normalized into a canonical form. In the second stage, a document (or a subtree of the document) is traversed to build a projection.

Normalizing XPath Expressions

Figure 4:
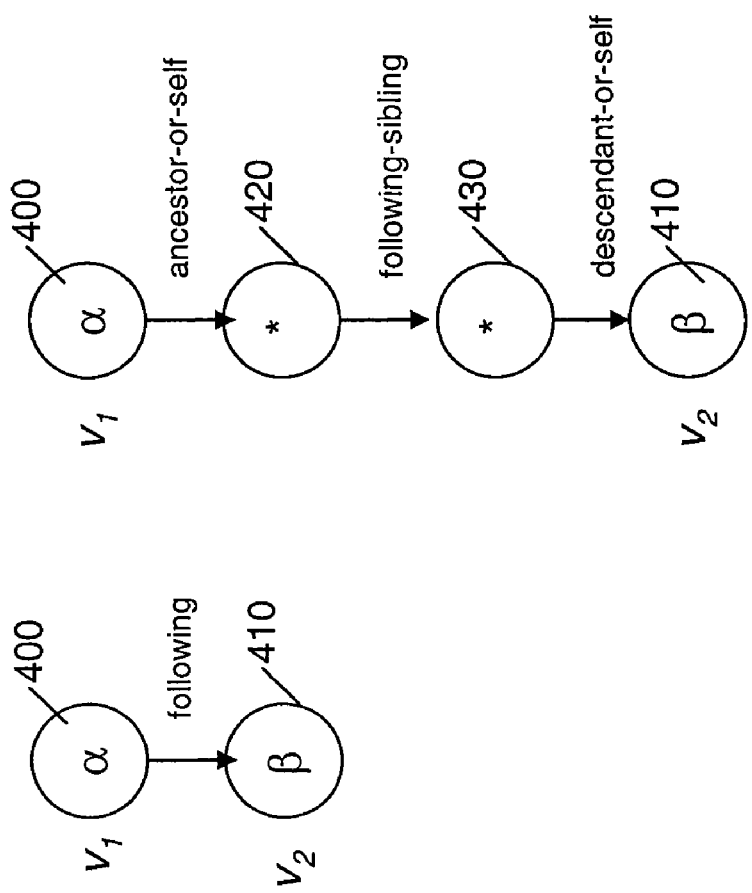
FIGS. 4-8 illustrate various rules for rewriting edges, in an embodiment of the present invention.
Figure 5:
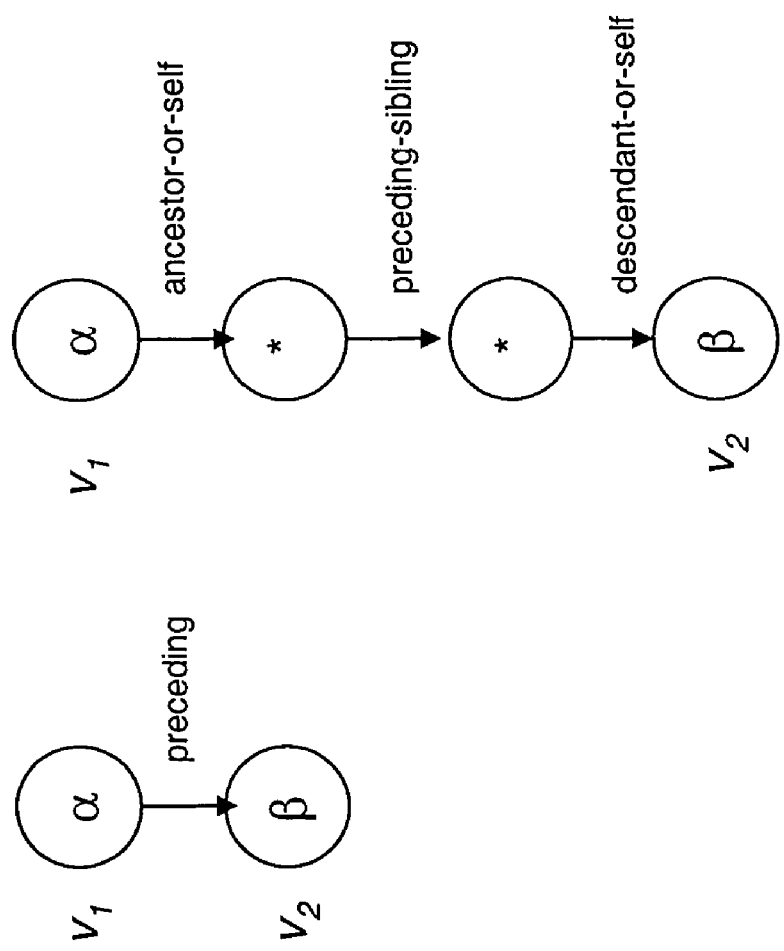
Figure 6:
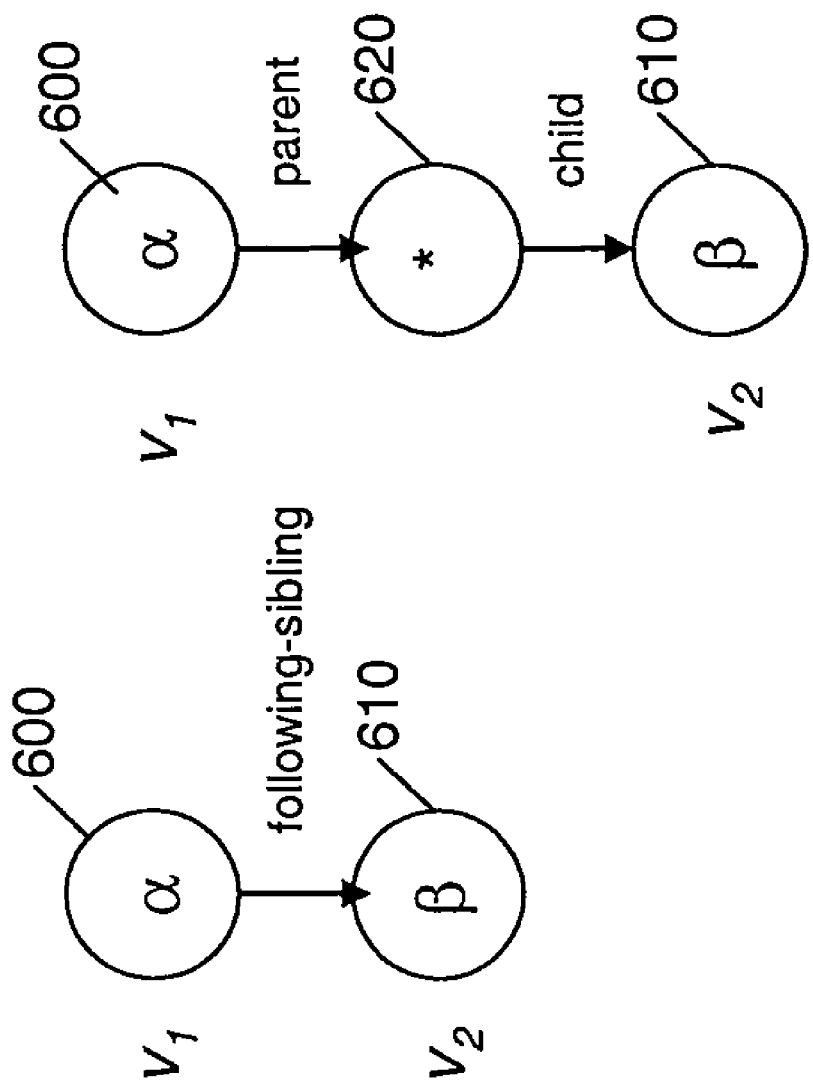
Figure 7:
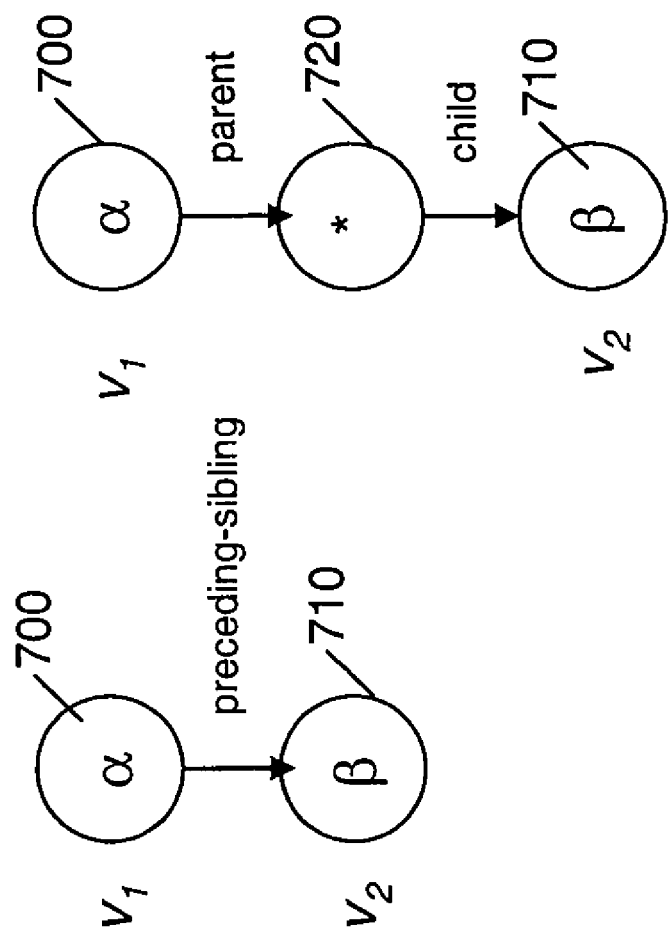

The XPath axes following, preceding, following-sibling and preceding-sibling are order-based axes (the result set for these axes depends on the order between sibling tree nodes). The first step in our normalization is to rewrite instances of these axes in XPath expressions into order-blind axes (such as parent and ancestor). The rules for rewriting XPath expression trees are shown in FIGS. 4-8. For example, in the FIG. 4, vertex 400 and vertex 410 are vertices in a given XPath expression tree, connected by an edge labeled with one of the order-based axes. The rewriting rules introduces new vertices 420 and 430. The rules are ordered so that the rules of FIG. 4 and FIG. 5 are applied until there are no instances of following and preceding in the XPath expression tree. The rules of FIG. 6 and FIG. 7 are then applied to the XPath expression tree.

For example, for the following-sibling axes, the present embodiment replaces instances of the pattern v1/following-sibling::v2 (600-610) with instances of v1/parent::*/v2 (600, 620, 610). The rewritten XPath expression is an approximation of the original one—it chooses "v2" elements that both precede and follow "v1" elements. The rewritings guarantee that for any document, if an element n participates in an embedding of the original XPath expression tree into the document, n also participates in an embedding of the rewritten tree into the document.

Figure 8:
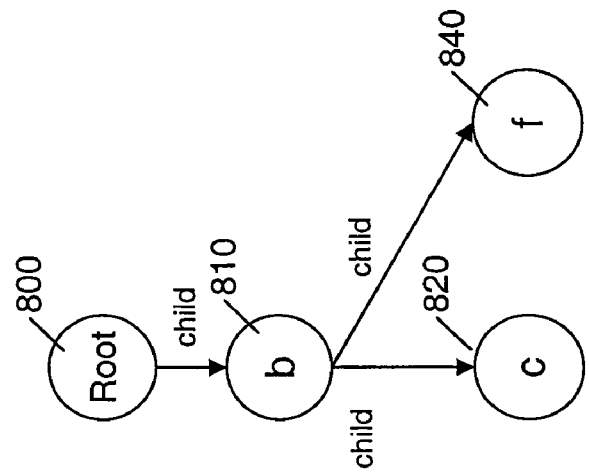
Figure 8:
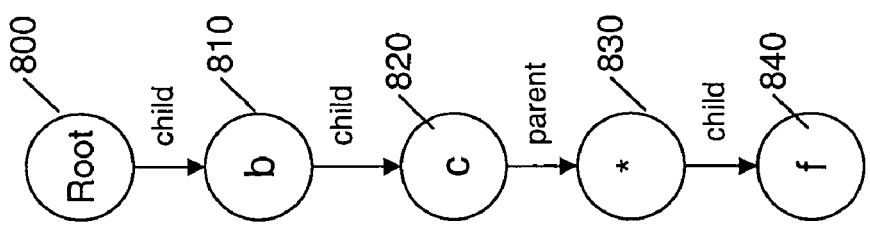

Once the XPath expression trees have been rewritten, the present embodiment performs further rewritings to remove redundancies. For example, if a vertex in an XPath expression tree has an incoming edge labeled child, and an outgoing edge labeled parent, the present embodiment merges the two vertices from which these edges are incident. The two vertices may be merged if they have the same label, or if the label of one of the vertices is the wildcard *. If the vertices cannot be merged because their labels differ, the present embodiment concludes that the XPath expression is unsatisfiable—there can be no document for which the XPath expression will return a result. For example, the XPath expression "//a/b/parent::c" is unsatisfiable. Unsatisfiable XPath expressions may be removed from the set of projection XPath expressions—there can be no embedding of these expressions into any document. FIG. 8 shows a rewritten XPath expression tree, where the vertices with edges incident on the vertex labeled "c" are merged.

Constructing a Projection

The present embodiment of the projection construction algorithm traverses the document in a depth-first manner and generates events, similar to SAX. A start element event is generated when the traversal first visits an element, and an end element event once the traversal of the subtree rooted at that element is finished. The present invention assumes that an event contains all information about the relevant element, such as its tag and unique identifier. At each of these events, an event handler is invoked to perform actions related to the construction of the tree. A start element event handler may direct the traverser to skip a subtree by issuing a skipSubtree call. In response to this call, the document traverser does not generate any events for the elements in the subtree of the element currently being processed. The next event generated will be an end element event for the corresponding element.

Definitions and Data Structures

The description of the present embodiment will use the following definitions and data structures.

Definition 5: Given a vertex $v \in V_T$ in the input XPath expression tree, the backward vertex set of v, B(v) is defined as $\{v'|(v,v) \in E_T, axis(v,v) \in \{parent, ancestor, ancestor-or-self, self\} \cup \{v|(v,v) \in E_T, axis(v,v) \in \{child, descendant, descendant-or-self, self\}$. A backward constraint is an edge between v and a vertex in its backward vertex set.

In other words, the backward vertex set with respect to a vertex v consists of those vertices to which an outgoing edge from v is labeled with a backward axis and those from which an incoming vertex into v is labeled with a forward axis. The present embodiment has a dual definition for a forward vertex set with respect to a vertex v.

Definition 6: Given a vertex $v \in V_T$ in the input XPath expression tree, the forward vertex set of v, F(v) is defined as $\{v'|(v,v) \in E_T, axis (v,v) \in \{(child, descendant, descendant-or-self, self\} \cup \{v''|(v,v) \in E_T, axis(v'',v) \in \{parent, ancestor, ancestor-or-self, self\}$. A forward constraint is an edge from between v and a vertex in its forward vertex set.

The following data structures are used in the algorithm of the present embodiment:

An active stack which maintains, at any time, the list of elements for which a start event has been received, but no end event has been received yet. For each element e in the stack the present embodiment maintains the following information:

tag(e), level(e), and id(e).

An ordered set children(e) of the byte array corresponding to the children of the element in the document.

A relation, match-found(e): $V_T \times V_T$.

A boolean variable, locked(e).

For each vertex in the XPath expression tree, a set of elements, matches(v).

Algorithm Overview

As events are generated during the traversal of the tree, the algorithm attempts to determine whether the element currently being processed may participate in an embedding. At the end element event, the algorithm makes a decision on whether the element node should be created or not, based on current information—it is conservative, if it cannot determine conclusively that the element can be discarded, the element node is created. The following two properties are used to determine whether an element belongs to an embedding:

A. Let an element e belong to an embedding E of T into D such that for some vertex v, E(v)=e. For each vertex v' in B(v), there must be some ancestor of e, say e', such that E(v')=e', and the relation between e and e' satisfies the edge constraint between v and v'. This is a straightforward consequence of the definition of embeddings. At a start element event for an event, the present embodiment verifies that if the label of e matches some vertex v, then such a candidate e' exists for all vertices $v' \in B(v)$. The matches list is used for this purpose. For a vertex v, it contains all ancestors of the current element e that have been identified as a possible candidate in an embedding with respect to v'. If matches(v) for some $v' \in B(v)$ does not contain an appropriate e', e cannot participate in an embedding with respect to v.

B. A similar statement can be made for forward vertex sets. Let an element e belong to an embedding E of T into D such that for some vertex v, E(v)=e. For each vertex v' in F(v), there must be some descendant of e, e', such that E(v')=e', and the relation between e and e' satisfies the edge constraint between v and v'. At the end element event, the algorithm can verify that if the label of e matches some vertex v, that such a candidate e' exists for all vertices $v' \in F(v)$. The match-found relation is used for this purpose. For some vertex v, if match-found(e) contains (v, v') for all vertices in F(v), the algorithm can conclude that e is a possible candidate in an embedding. If, on other hand, this property does not hold for any v that matches the tag of e, the algorithm can conclude that the element does not participate in any embedding. The match-found (e) relation is set during end element events of descendants of e. When an element e is identified as a possible candidate in an embedding with respect to a vertex v", then for all elements e in matches (v), where $v \in B(v'')$, the tuple (v, v') is added to match-found(e).

The algorithm constructs nodes for all elements that may participate in an embedding. All ancestors of these elements are added as nodes as well. The locked(e) variable is used to propagate the information that a possible embedding candidate exists in the subtree of e so that the algorithm can create a node for that element as well.

The algorithm can improve efficiency by skipping subtrees when possible. A skipSubtree call can be issued in the start element event handler if it can be determined that no element in the subtree will participate in an embedding. During the processing of an element e, one can skip the subtree if for all vertices v:

For all (v, v'), $axis_T$ (v, v')=descendant or descendant-or-self, matches(v) is empty, or For all (v, v'), $axis_T$(v, v')=ancestor or ancestor-or-self, matches (v') is empty, or For all (v, v'), $axis_T$ (v, v')=child, level(e)>level(e')+2, where e' is the element in matches(v) with the highest level, or For all (v, v'), $axis_T$ (v, v')=parent, level(e)>level(e')+2, where e' is the element in matches(v) with the highest level.

The handling of multiple XPath expressions is a straightforward extension to the handling of a single XPath expression—the algorithm evaluates each of them in parallel. A node is created in the tree for an element if it is required by any of the XPath expressions.

Algorithm Details

The projector algorithm processes a given XPath expression $T=(V_T, E_T)$ and a document $D=(N_D, E_D)$ to construct the tree representation in a bottom-up manner—at each end element event for an element, the projector decides whether to build a node or discard the element based on decisions taken for its children. Initially, the active stack and matches(v) for all $v \in V_T$ are empty.

At a start element event for an element e, push e on to the active stack. children(e), match-found(e) are empty. locked (e) is set to be false.

For each vertex v in the XPath expression tree such that tag(e) matches label(v), matches(v)=matches(v) ∪ e.

For each vertex v in the XPath expression tree such that tag(e) matches label(v), prune matches(v). For each v' in B(v), we check that there exists some element in matches(v') such that the edge constraint between v and v' is met. For example, if the edge between v and v' is an edge labeled ancestor, matches(v') should contain an ancestor of e. If not, remove e from matches(v).

At an end element event for an element e:

If locked(e) is true, materialize the element by creating a new materialized node. Add children(e) as children of that node.

Otherwise, if e does not belong to matches(v) for any v that is in $V_T$, examine children(e). If children(e) contains any materialized nodes, construct a node for e, and add children (e) as children of that node. Otherwise, discard e and the contents of children(e).

Otherwise, if for all $v \in V_T$, where matches(v) contains e, there exists some v' in F(v) such that (v, v')∉match-found(e), construct a node corresponding to e. The contents of children (e) are discarded.

Otherwise, create a node for the element and add children (e) as children of that node. Let S be the set of all elements e' in the active stack such that there exists an edge (v, v'), where e ∈ matches(v), e' ∈ matches(v') and the edge constraint specified by (v, v') is matched by (e, e'). For each such e', the present embodiment adds the tuple (v', v) to match-found(e'). If the cardinality of S is greater than 1, the present embodiment marks e as locked.

In all cases, once the node for e is constructed, e is popped of the active stack, and e is appended to children(e') where e' is the parent of e in D (the new head of the active stack). e is also removed from matches(v) for all v. Finally, if e is marked locked, e' is marked locked as well.

The present embodiment can handle complex axes such as ancestor and following-sibling. Our experiments demonstrate that the projections generated by the present embodiment are small compared to the full data instance, even when these complex queries are used. In addition to reducing the memory overhead of the in-memory representation of XML, the present embodiment is efficient and can reduce the cost of constructing the instance significantly.

Computer Implementation

The present embodiment may be realized in hardware, software, or a combination of hardware and software. A system according to a preferred embodiment of the present embodiment may be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

An embodiment of the present embodiment may also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following: a) conversion to another language, code or, notation; and b) reproduction in a different material form.

A computer system may include, inter alia, one or more computers and at least a computer readable medium, allowing a computer system, to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer readable medium may include, for example, volatile storage such as RAM, buffers, cache and memory.

Figure 9:
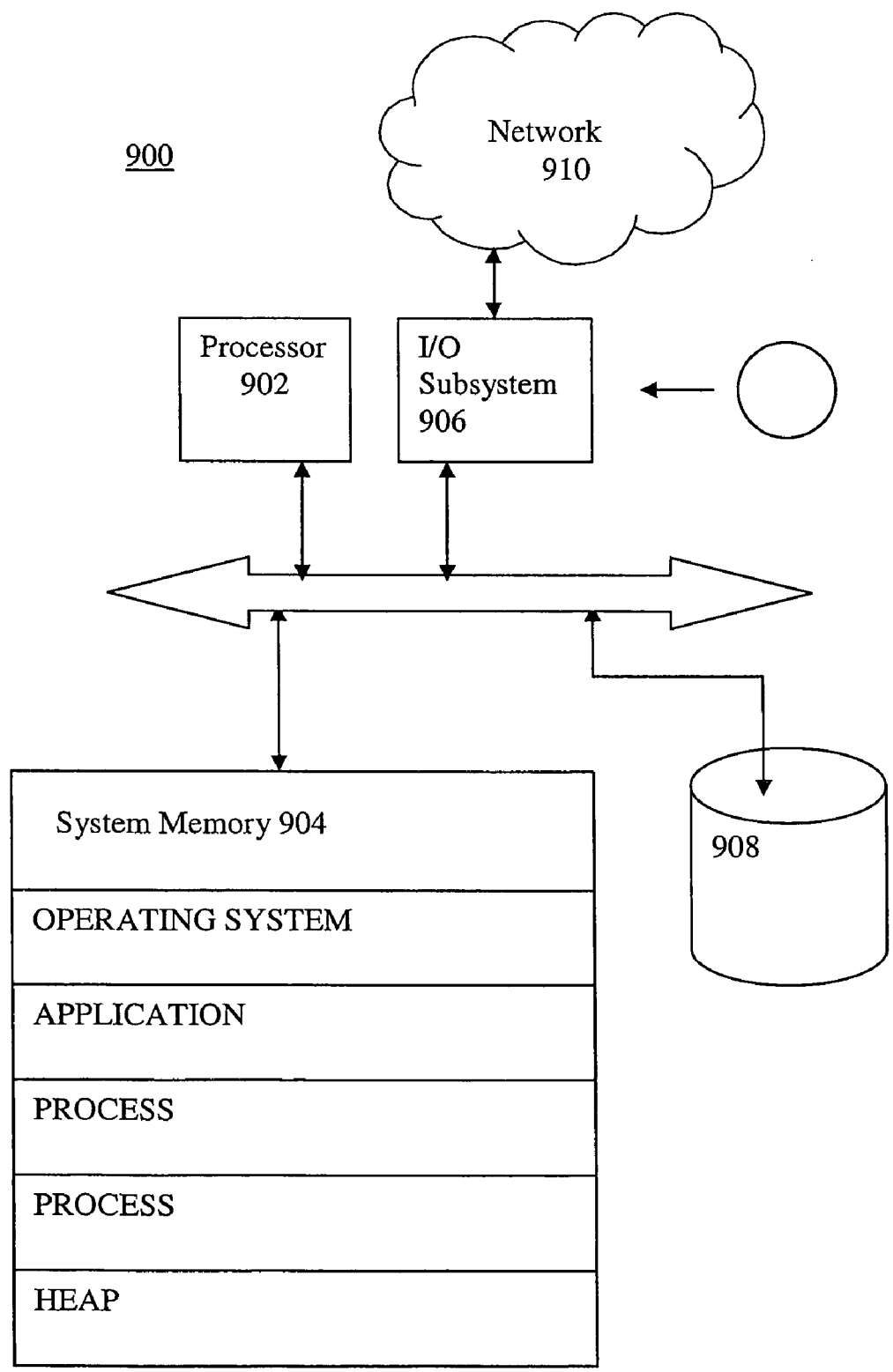
FIG. 9 illustrates an information processing system implementing an embodiment of the present invention.

FIG. 9 is a high level block diagram showing an information processing system 900 useful for implementing one embodiment of the present embodiment. The computer system 900 includes one or more processors, such as processor 902, a memory 904, an input/output subsystem 906, and a mass storage device 908. The system 900 is connected to a network 910 such as the Internet. Various software embodiments are described in terms of this exemplary computer system.

The I/O subsystem 906 can include a removable storage drive reads from and/or writes to a removable storage unit in a manner well known to those having ordinary skill in the art. The removable storage unit, represents a floppy disk, a compact disc, magnetic tape, optical disk, etc. which is read by and written to by removable storage drive. As will be appreciated, the removable storage unit includes a computer readable medium having stored therein computer software and/or data.

Therefore, while there has been described what is presently considered to be the preferred embodiment, it will be understood by those skilled in the art that other modifications can be made within the spirit of the invention.

The invention claimed is:

1. A computer readable medium including computer instructions for regulating communication of information in a data structure between components of a computer program, the medium comprising executable instructions to perform the steps:

provding at least one XPath query to an XML processor where the XPath query comprises forward, backward, following-sibling, and preceding-sibling axes; providing an XML document to the XML processor; and the following steps performed by the XML processor: deriving a set of XPath expressions from the XML document, wherein the XPath expressions are represented as a rooted XPath expression tree with labeled vertices and edges, and wherein the XPath expression tree comprises at least one axis selected from a group consisting of: backward, ancestor, parent, following, preceding, following-sibling, and preceding-sibling axes;

constructing a projection of the XML document for evaluation of the XPath query, the projection based on the XPath expression tree, wherein the constructing step comprises:

1) normalizing the X-Path expression tree into a canonical form, wherein the normalizing step comprises:
a) rewriting instances of following, preceding, following-sibling and preceding-sibling axes in the XPath expression tree into order-blind axes, such as parent and ancestor, by introducing new vertices such that there are no more instances of following and preceding in the rewritten XPath expression tree; and
b) merging vertices of the rewritten XPath expression tree to remove redundancies;

2) traversing the XML document in a depth-first manner to build a tree representation of the XML document, the traversing step comprising:
a) generating start events when the traversal first visits an element;
b) generating end events once the traversal of a subtree rooted at that element is finished;
c) concurrently with generating the events, constructing nodes for all elements that may participate in an embedding; and
d) adding all ancestor nodes of the elements that may participate in an embedding;

evaluating the at least one XPath query against the tree representation in a bottom-up manner to produce a result such that the result of the evaluation of the XPath query on the projection of the XML document is the same as a result of evaluation of the XPath query on the XML document and comprises all nodes that are solutions of the XPath query, and their backward axes; and serializing the result.

2. The computer readable medium of claim 1 wherein the traversing step further comprises eliminating all pathological queries from the at least one XPath query.

3. The computer readable medium of claim 1 wherein the traversing step further comprises rewriting the at least one XPath query into a simpler, approximate query.

4. The computer readable medium of claim 1 wherein the XML document is provided via a streaming data process.

5. The computer readable medium of claim 1 wherein the backward axes further comprise at least a parent axis.

6. The computer readable medium of claim 1 wherein the backward axes further comprise at least an ancestor axis.

7. A method of projecting a representation of an Extensible Markup Language (XML) document, the method comprising steps of:

A) receiving the XML document as input;
B) receiving at least one XPath query to be evaluated against the XML document;
C) deriving a set of XPath expressions from the XML document, wherein the XPath expressions are represented as a rooted XPath expression tree with labeled vertices and edges, and wherein the XPath expression tree comprises at least one axis selected from a group consisting of: backward, ancestor, parent, following, preceding, following-sibling, and preceding-sibling axes; and
D) constructing a projection of the XML document for evaluation of the XPath query, the projection based on the XPath expression tree, wherein the constructing step comprises:

1) normalizing the XPath expression tree into a canonical form, wherein the normalizing step comprises:
a) rewriting instances of following, preceding, following-sibling and preceding-sibling axes in the XPath expression tree into order-blind axes, such as parent and ancestor, by introducing new vertices such that there are no more instances of following and preceding in the rewritten XPath expression tree; and
b) merging vertices of the rewritten XPath expression tree to remove redundancies;

2) traversing the XML document in a depth-first manner to build a tree representation of the XML document, the traversing step comprising:
a) generating start events when the traversal first visits an element;
b) generating end events once the traversal of a subtree rooted at that element is finished;
c) concurrently with generating the events, constructing nodes for all elements that may participate in an embedding; and
d) adding all ancestor nodes of the elements that may participate in an embedding;

E) evaluating the at least one XPath query against the tree representation in a bottom-up manner to produce a result such that the result of the evaluation of the XPath query on the projection of the XML document is the same as a result of evaluation of the XPath query on the XML document and comprises all nodes that are solutions of the XPath query, and their backward axes; and F) serializing the result.

8. The method of claim 7 wherein the evaluating step comprises deciding whether to build a node or discard the element based on decisions taken for children of the element.

9. The method of claim 8 wherein traversing the XML document further comprises issuing a skipSubtree call if it can be determined that no element in the subtree will participate in an embedding.

10. The method of claim 7 wherein multiple XPath expressions are evaluated in parallel.

11. The method of claim 7 wherein the evaluating step comprises determining at the end element event, whether the element node should be created or not, based on current information.

12. The method of claim 7 wherein the traversing step further comprises removing unsatisfiable XPath expressions.

* * * * *